US010997160B1

(12) United States Patent
Vig et al.

(10) Patent No.: US 10,997,160 B1
(45) Date of Patent: May 4, 2021

(54) STREAMING COMMITTED TRANSACTION UPDATES TO A DATA STORE

(71) Applicant: Amazon Technologies, Inc., Seattle, WA (US)

(72) Inventors: Akshat Vig, Seattle, WA (US); Somasundaram Perianayagam, Seattle, WA (US); Vaibhav Jain, Seattle, WA (US); Alexander Richard Keyes, Seattle, WA (US); Stefano Stefani, Issaquah, WA (US); Douglas Brian Terry, San Carlos, CA (US); James Christopher Sorenson, III, Seattle, WA (US); Amit Gupta, Redmond, WA (US); Rishabh Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 16/364,025

(22) Filed: Mar. 25, 2019

(51) Int. Cl.
*G06F 16/23* (2019.01)

(52) U.S. Cl.
CPC ...... *G06F 16/2379* (2019.01); *G06F 16/2365* (2019.01)

(58) Field of Classification Search
CPC ..................................................... G06F 16/23
USPC ......................................... 707/640, 648, 650
See application file for complete search history.

(56) References Cited

U.S. PATENT DOCUMENTS

| 6,012,059 | A | 1/2000 | Neimat et al. |
| 6,904,411 | B2 * | 6/2005 | Hinkle .................. G06Q 40/00 705/1.1 |
| 7,647,327 | B2 | 1/2010 | Aguren |
| 7,653,663 | B1 | 1/2010 | Wright et al. |
| 7,668,876 | B1 | 2/2010 | Kulkarni |
| 7,730,034 | B1 | 6/2010 | Deflaux et al. |
| 7,949,662 | B2 | 5/2011 | Farber et al. |
| 8,078,582 | B2 | 12/2011 | Wang et al. |
| 8,108,343 | B2 | 1/2012 | Wang et al. |
| 8,510,270 | B2 | 8/2013 | Fereek et al. |
| 8,548,945 | B2 | 10/2013 | Dwyer et al. |
| 8,650,155 | B2 | 2/2014 | Corbin et al. |
| 8,676,752 | B2 | 3/2014 | Kundu et al. |
| 8,892,514 | B2 | 11/2014 | Rank et al. |
| 2006/0053181 | A1 | 3/2006 | Anand et al. |
| 2007/0162516 | A1 | 7/2007 | Thiel et al. |
| 2010/0082547 | A1 | 4/2010 | Mace et al. |
| 2011/0246416 | A1 | 10/2011 | Prahlad et al. |

(Continued)

OTHER PUBLICATIONS

U.S. Appl. No. 14/712,787, filed May 14, 2015, Lei Ye.

(Continued)

*Primary Examiner* — Baoquoc N To
(74) *Attorney, Agent, or Firm* — Robert C. Kowert; Kowert, Hood, Munyon, Rankin & Goetzel, P.C.

(57) ABSTRACT

Updates performed as part of transaction requests to a data store may be included in a stream of updates. Updates to items in the data store that are included in transactions determined not to be committed to the data store may be excluded from the stream of updates. Records in the stream of updates may include an identifier for the transaction that included the update described by the record. The identifier for the transaction may be used to identify updates to other items in the data store that are included in the same transaction.

20 Claims, 11 Drawing Sheets

(56) References Cited

U.S. PATENT DOCUMENTS

2011/0295804 A1    12/2011   Erofeev
2018/0260890 A1*   9/2018   Sass ..................... G06Q 40/10

OTHER PUBLICATIONS

U.S. Appl. No. 16/014,890, filed Jun. 21, 2018, Douglas Brian Terry et al.
Rachel Harding, et al., "An Evaluation of Distributed Concurrency Control", Proceeding of the VLDB Endowment, vol. 10, No. 5, 2017, pp. 553-564.
"Chain Reaction: a Causal+ Consistent Datastore based on Chain Replication" Sergio Almeida, et al., Apr. 15-17, 2013, pp. 85-98.
"Chain Replication in Theory and in Practice", Scott Lystig Fritchie, Sep. 30, 2010, pp. 1-11.
"Chain Replication for Supporting High Throughput and Availability", Robbed van Renesse, Fred B. Schneider, 2004, pp. 91-104.

* cited by examiner

STREAMING COMMITTED TRANSACTION UPDATES TO A DATA STORE

BACKGROUND

As the costs of computing and data storage fall with the increased use of virtualization and cloud computing, new applications for data analysis are becoming more cost-effective. Many database services implemented at provider networks support very high volumes of updates, leading to data sets that may have to be distributed across tens or hundreds of physical storage devices, sometimes spread across multiple data centers. The database services may expose APIs (application programming interfaces) for reads and writes (e.g., creates/inserts, deletes, and updates of database records) and which enable clients to easily change the contents of data objects such as tables and view the current version of the contents. However, while the interfaces provided by the database services may enable clients to access the data objects, the various changes that were applied to the data may not be accessible to clients. Information about the changes that are performed on tables and other data objects may be useful for a number of applications such as offline data mining to identify trends, selective checkpointing of relevant subsets of data at remote sites, and so on.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement illustrating streaming committed transaction updates to a data store, according to some embodiments. Changes to items in a data store may be captured and stored as records in a stream of updates. However, because the records may describe the updates to individual items, those item updates that are performed as part of a transaction could be retrieved from the stream of updates at a different time than other updates performed as part of the same transaction, which would make transaction based application of updates retrieved from the fail to conform to transaction semantics where all transaction updates are visible together. Streaming committed transaction updates may be implemented to ensure that transaction semantics can be satisfied when retrieving updates to a data store from a stream of changes in various applications, adding the capability to satisfy transaction semantics at those applications in order to improve application performance. For example, applications can maintain an index transactionally or maintain a delayed replica transactionally from the stream of updates because the updates associated with the transaction can be identified by the application and applied to become visible together in the same way that a transaction would be visible.

Figure 1:
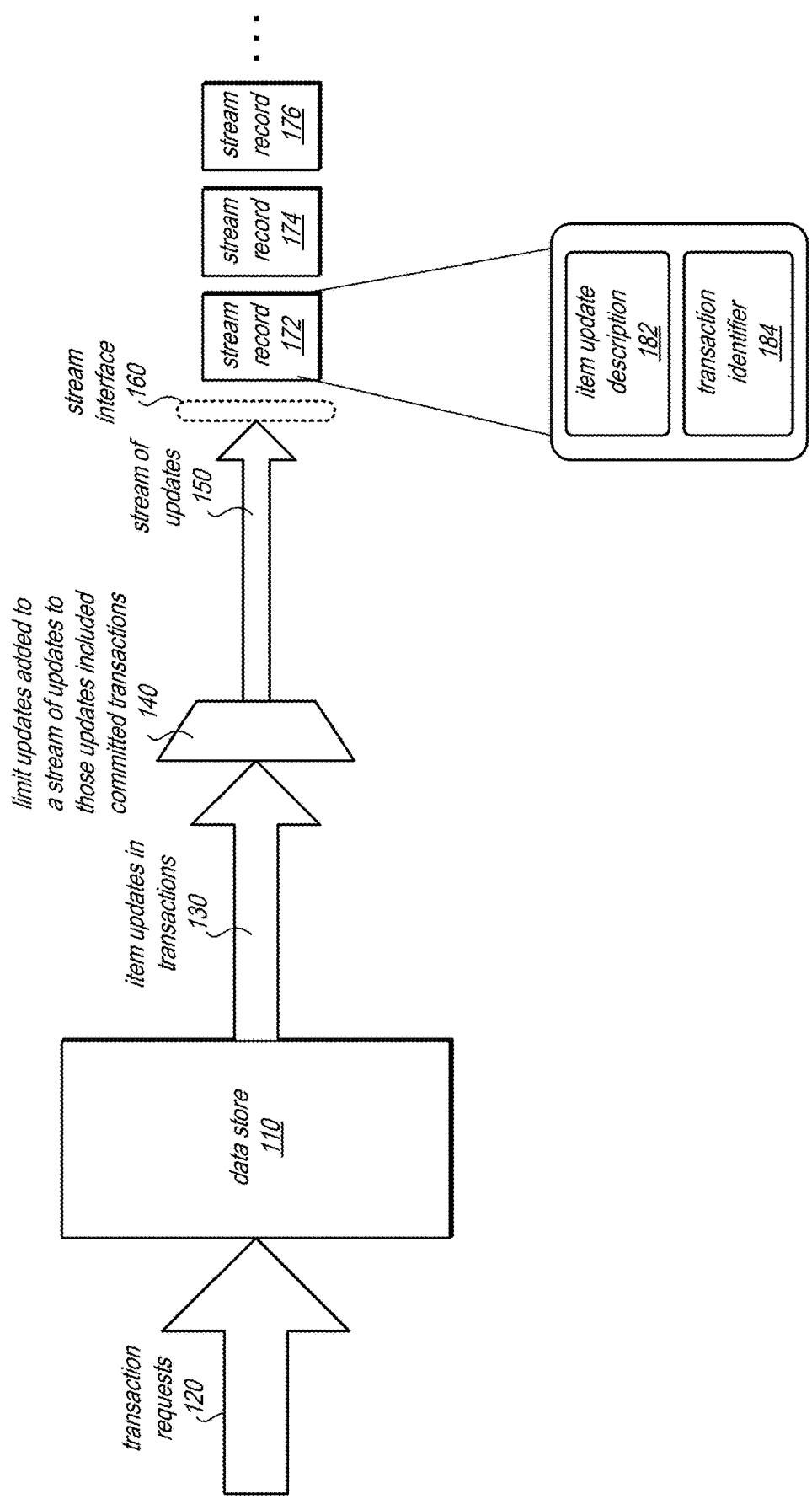
FIG. 1 is a logical block diagram illustrating streaming committed transaction updates to a data store, according to some embodiments.

FIG. 1 is a logical block diagram illustrating streaming committed transaction updates to a data store, according to some embodiments. Requests to perform transactions 120 may be received at data store 110. The requests 120 may include updates to multiple items stored in the same location (e.g., a storage host) or across multiple locations (e.g., at different storage hosts) or data structures (e.g., across partitions, tables, collections, data sets, etc.). As indicated at 130, the item updates from the transactions may be identified and then evaluated to filter, exclude, or otherwise limit updates added to a stream of updates to those updates included in committed transactions, as indicated at 140, as discussed below with regard to FIGS. 6 and 9. In this way, item updates that have not yet (or will not ever) been in a committed transaction, are not included in a stream of updates 150 which may be made accessible via stream interface 160, in some embodiments.

Stream interface 160 may offer a different interface than an interface to data store 110 to perform operations, including transactions, on items. Instead, stream interface 160 may allow for push or pull-based techniques, as discussed below with regard to FIG. 6, to access the stream of updates to implement various applications that rely upon replicating updates to data store 110.

The stream interface 160 may provide the updates as stream records, such as stream records 172, 174, and 176. Stream records may include a description of the item update, as illustrated at 182, and a transaction identifier, as illustrated at 184. The transaction identifier may allow a client application to identify an update as part of a transaction, and to identify other updates (e.g., subsequently received via stream interface 160 in stream records) that are also included in the same transaction (e.g., as the other updates may also include the same identifier in their respective stream records). The transaction identifier may be used to retrieve or associate transaction information, in some embodiments, as discussed below with regard to FIGS. 7, 8, and 10.

Please note that previous descriptions of implementing streaming committed transaction updates are not intended to be limiting, but are merely provided as logical examples.

This specification begins with a general description of a provider network that may implement services that may implement streaming committed transaction updates. Then various examples of a database service are discussed, including different components/modules, or arrangements of components/module, that may be employed as part of implementing the database service, in one embodiment. A number of different methods and techniques to implement streaming committed transaction updates are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
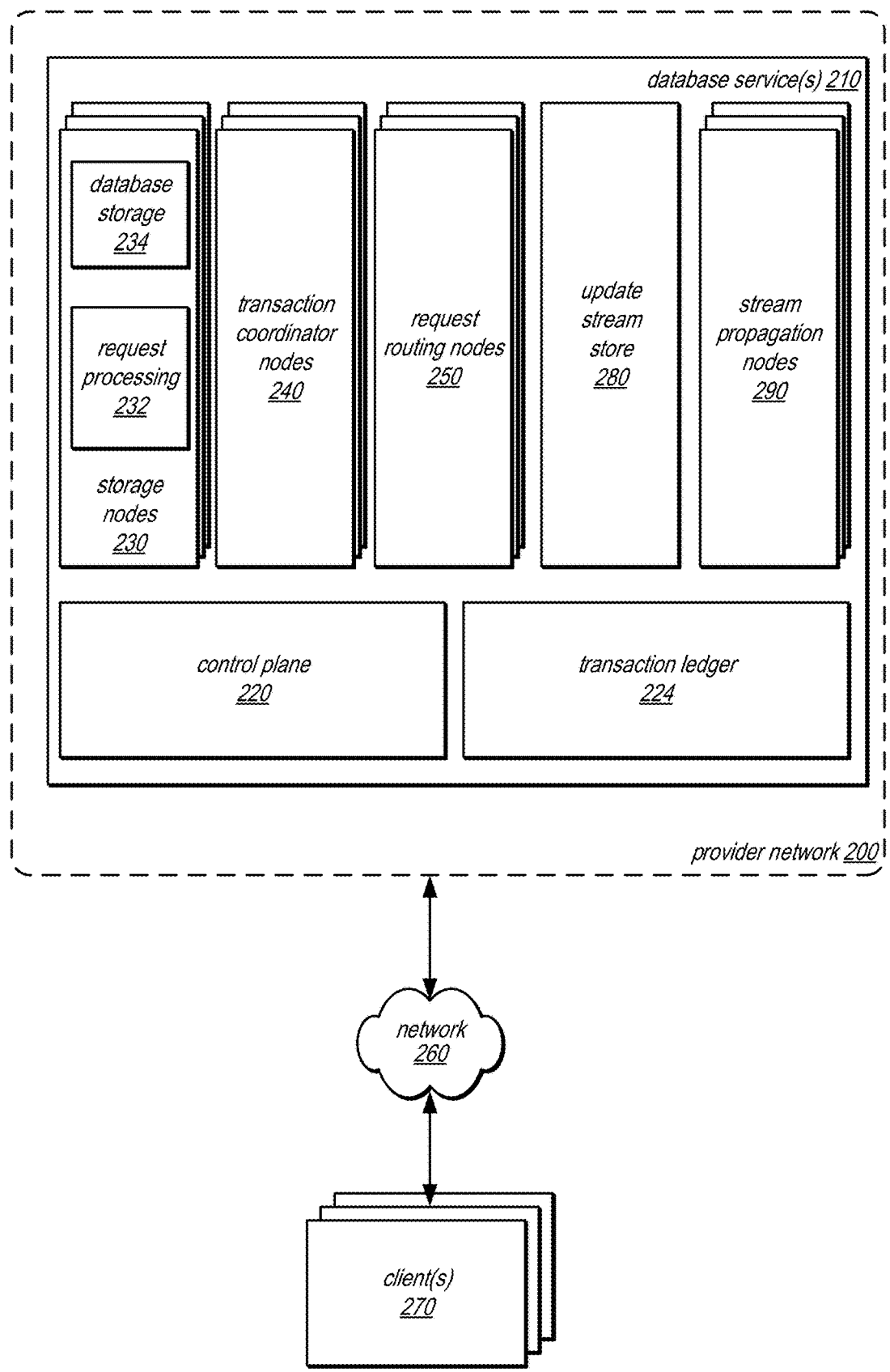
FIG. 2 is a logical block diagram illustrating a provider network that implements a database service that may implement streaming committed transaction updates, according to some embodiments.

FIG. 2 is a logical block diagram illustrating a provider network that implements a database service that may implement streaming committed transaction updates, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network 200. In one embodiment, provider network 200 may implement various computing resources or services, such as database service(s) 210 (e.g., relational or non-relational (NoSQL) database query engines), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 11 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services that implement or allow transactions.

In one embodiment, clients 250 may encompass any type of client configurable to submit network-based requests to provider network 200 via network 260, including requests for database service(s) 210 (e.g., to perform a transaction to a database hosted in database service 210). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database client/application (or user interface thereof), a media application, an office application or any other application that may make use of a database in database service(s) 210 to store and/or access the data to implement various applications or to access a stream of updates to a database as discussed below with regard to FIG. 6. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture. Note that in some embodiments, clients of database service(s) 210 (e.g., to perform transactions and/or consume database updates may be implemented within provider network 200 (e.g., applications hosted on a virtual compute service).

In one embodiment, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network 200. It is noted that in one embodiment, client(s) 250 may communicate with provider network 200 using a private network rather than the public Internet.

Figure 3A:
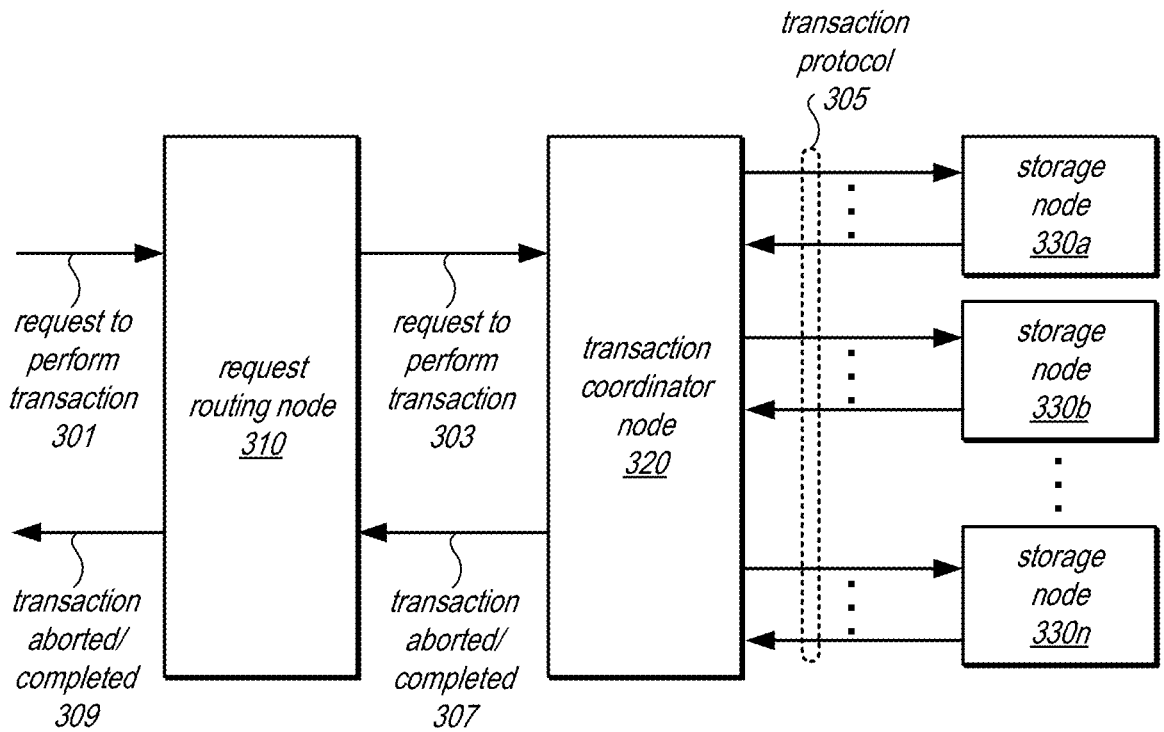
FIGS. 3A and 3B are logical block diagrams illustrating different routing paths for transactions and non-transaction requests, according to some embodiments.
Figure 3B:
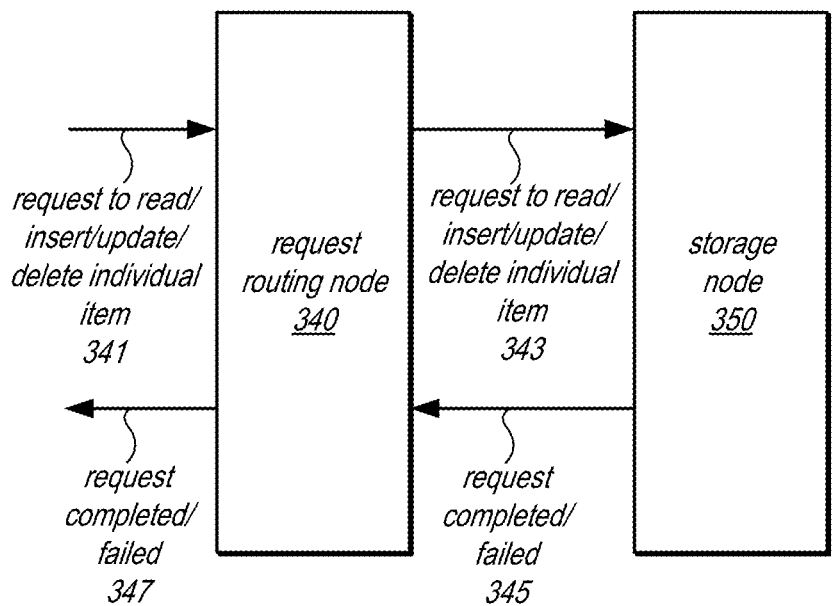

Database service 210 may implement request routing nodes 250, in one embodiment. Request routing nodes 250 may receive, authenticate, parse, throttle and/or dispatch service or other access requests, among other things, in one embodiment. For example, FIGS. 3A and 3B illustrate different routing paths for transactions and non-transaction requests, according to some embodiments. As discussed below with regard to FIGS. 3A and 4, a transaction coordinator node, such as one of transaction coordinator nodes 240, may be included in the path for a request to perform a transaction, in some embodiments, while a non-transaction request may be sent directly to an appropriate storage node.

In one embodiment, request routing nodes 250 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes (which may be storage nodes 230 and/or storage nodes in another system or service, like storage nodes 282). Similarly, a request may be a request to perform operations on individual items (e.g., requests to read, write, update, delete, add, or insert items in a table, according to a specified consistency level or characteristic). In one embodiment, request routing nodes 250 may perform parsing and/or throttling of service requests, authentication and/or metering of service requests, dispatching service requests, and/or maintaining partition assignments that map storage nodes to partitions of tables hosted in database service(s) 210.

In one embodiment, database service 210 may implement control plane 220 to implement one or more administrative components, such as automated admin instances which may provide a variety of visibility and/or control functions). Control plane 220 may provide visibility and control to system administrators, detect split events for partitions of tables at storage nodes, and/or anomaly control, resource allocation, in one embodiment. In one embodiment, control plane 220 may also include an admin console, through which system administrators may interact with database service 210 (and/or the underlying system). In one embodiment, the admin console may be the primary point of visibility and control for database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at database service 210, in one embodiment.

Control plane 220 may direct the performance of different types of control plane operations among the nodes, systems, or devices implementing database service 210, in one embodiment. For instance, control plane 220 may communicate with processing nodes to initiate the performance of various control plane operations, such as moves, splits, update tables, delete tables, create indexes, etc. . . . . .

In one embodiment, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement request processing 232, in one embodiment. Request processing 232 may create, update, define, query, and/or otherwise administer databases, in one embodiment. For instance, request processing 232 may maintain a database according to a database model (e.g., a relational or non-relational database model). In one embodiment, request processing 232 may allow a client to manage data definitions (e.g., Data Definition Language (DDL) requests to describe column definitions, requests to add item attributes, etc.). In one embodiment, request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, request processing 232 may also perform other management functions, such as enforcing access controls or permissions, concurrency control, or recovery operations.

In one embodiment, database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG.

2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the database service 210. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, a relational data model that stores database tables structured as rows with fields for a defined number of columns may be implemented. In some embodiments, non-relational (e.g., NoSQL), key-value, or semi structured data may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key, in some embodiments. As discussed below with regard to FIG. 5, in some embodiments, items in a table may include attributes that are either system data or application data.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describe Tables API) may simply return the current known state of the tables or secondary indexes maintained by the service on behalf of a client/user. The data plane APIs provided by database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Database service 210 may include update stream store 280 which may store a stream of updates using durable log publisher or other ordered log storage service that enforces an ordering of updates to the log to provide the updates described by the log in an order according to which the updates were applied (e.g., according to chain replication, Paxos, or other consensus and ordering techniques). Similarly, the stream of updates to the transaction ledger may include one or more records that are provided from the stream of updates in an order according to which the transactions were applied. Stream propagation node(s) 290 may read from the stream of updates stored in update stream store 280 as discussed below with regard to FIG. 6.

FIG. 3A illustrates a routing path for requests to perform transactions. A request routing node 310 may receive a request 301 to perform a transaction (e.g., a TransactItems request). In some embodiments, the request 301 may include one or more operations to perform as part of the transaction (e.g., read/get, write/update, insert/add, delete/remove operations). In at least some embodiments, the request 301 may include preconditions to be met in order for the transaction to commit. For instance, a precondition may check that an attribute exists or that it has a specific value or that its value begins with a particular string. Preconditions may involve any items in any tables and are not limited to the items being updated in the transaction (e.g., a transaction is performed upon table A but a precondition can be specified and evaluated with respect to table B). As an example, suppose that an application wishes to transfer $50 from Bob's bank account to Mary's account. This application may first read both Bob's and Mary's account balances, compute the adjusted amounts, and then submit a transaction that writes new balances with the condition that the balances did not change between when they were read and when the transaction was processed.

Request routing node 310 may dispatch or send the request 303 to perform the transaction 303 to a selected transaction coordination node 320 (e.g., according to various load balancing or other request distribution techniques), in some embodiments. Transaction coordinator node 320 may perform a transaction protocol 305, discussed in detail below with regard to FIG. 4, in some embodiments. Request may be sent to one or multiple storage nodes, such as storage nodes 330a, 330b, and 330n (which may be storage nodes in database services 210 and/or other data stores, such as storage nodes for storage service(s) 280). Storage nodes 330 may order the transaction (or reject/abort/fail it) according to a timestamp value or other sequence value assigned to it by transaction coordinator node 320, along with other transactions received from transaction coordinator 320 and/or directly from request routing node 310 (or other request routing node). Transaction coordinator node 320 may return an indication as to whether the transaction aborted or completed successfully to request routing node 310, which in turn may return an indication as to whether the transaction aborted or completed 309 (e.g., to a requesting client).

FIG. 3B illustrates a routing path for requests to perform non-transactions, according to some embodiments. As indicated at 341, a request routing node 340 may receive a request to read, inset, update, or delete an individual item in a database table, in some embodiments. Instead of routing the request to a transaction coordinator, like transaction coordinator 320 in FIG. 3A, request routing node 340 may direct the request 343 directly to a storage node that stores the item (e.g., in the appropriate partition of a database table), in some embodiments. For example, request routing node 340 may maintain a listing or other information describing a partitioning scheme for a table (e.g., a primary key value and hash function to determine a hash value that may be mapped to one partition of the table. Storage node 350 may determine whether to complete or fail the request to read, insert, update, or delete the individual item, independently from other storage nodes or a transaction coordinator perform a transaction that includes an operation to be performed at storage node 350. As indicated at 345 and 347, an indication that the request completed or failed may be provided to request routing node 340, which may in turn provide the request completion/failure notification to a client. Unlike updates included as part of transactions, non-transaction updates may not include an identifier for a transaction, in various embodiments. In this way, a singleton update (e.g., a non-transaction update) can be performed and placed in the stream without passing through filtering or other transaction related analyses, as discussed below with regard to FIG. 6.

Figure 4:
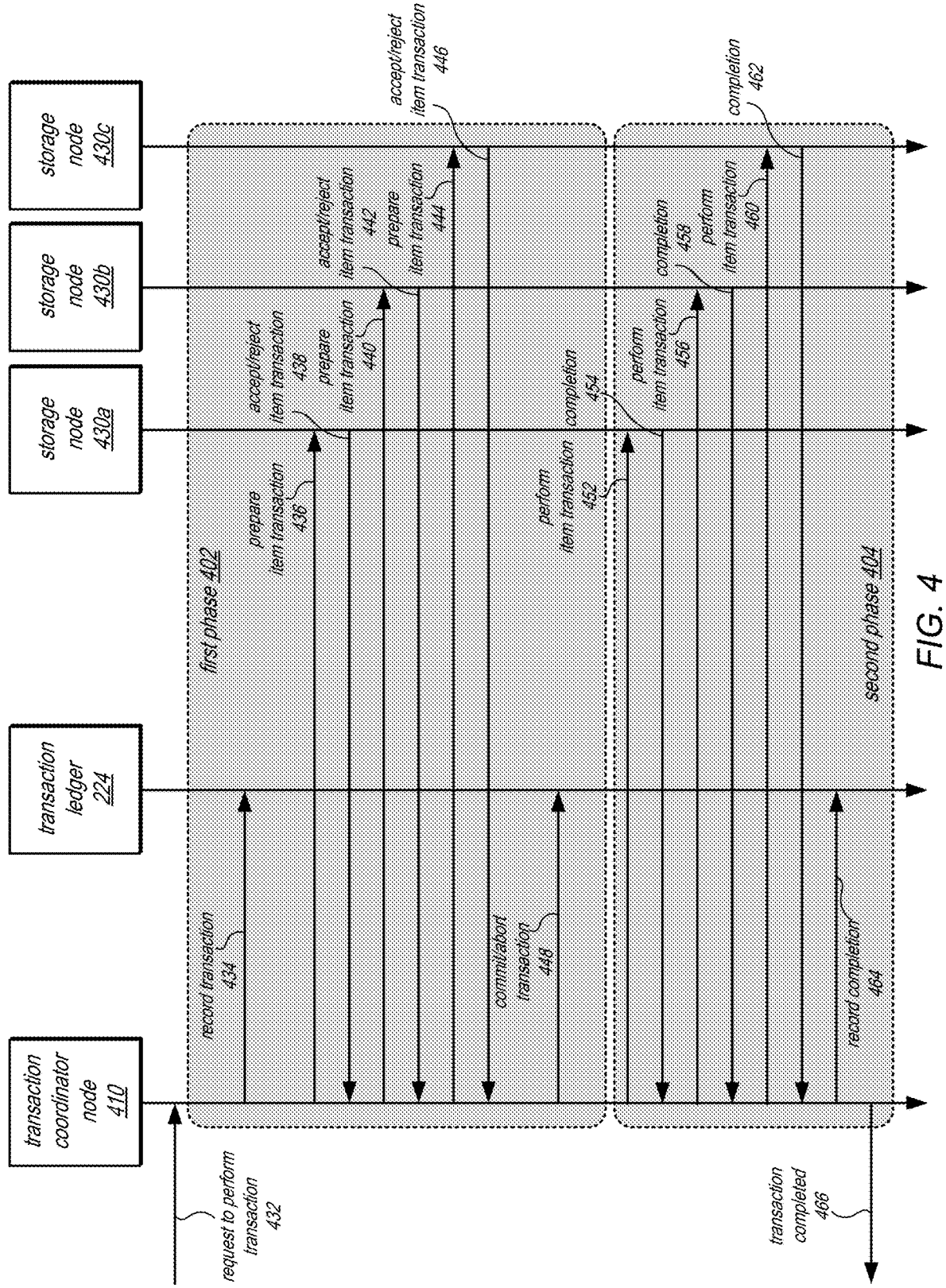
FIG. 4 is a sequence diagram illustrating a transaction protocol, according to some embodiments.
Figure 5:
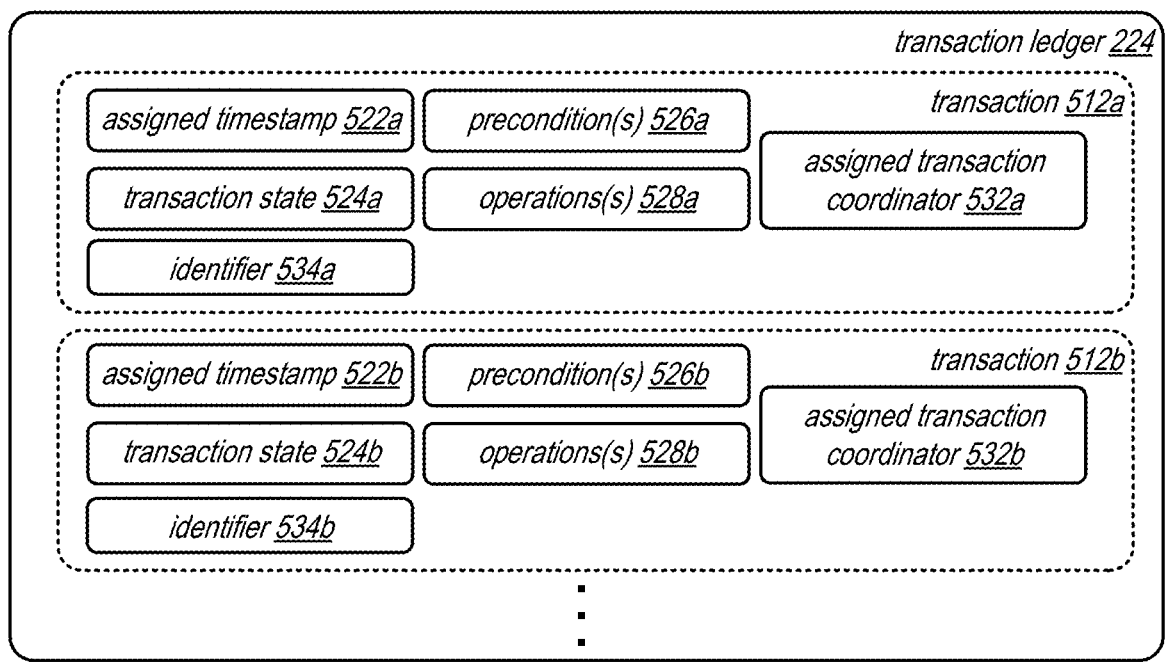
FIG. 5 is an example transaction ledger for performing a transaction protocol, according to some embodiments.

FIG. 4 is a sequence diagram illustrating a transaction protocol, according to some embodiments. In at least some embodiments, a two-phase protocol may be implemented for a transaction coordinator to determine whether a transaction can be committed to a distributed database. A request to perform a transaction may be received 432 at transaction coordinator node 410, in some embodiments. Transaction coordinator 410 may record the transaction 434 in transaction ledger 420, in some embodiments. FIG. 5 is an example transaction ledger for performing a transaction protocol, according to some embodiments.

In various embodiments, transaction ledger 420 may be maintained to ensure the survival of transactions beyond the failure of individual transaction coordinators. For example, to ensure that a failure of a transaction coordinator, such as transaction coordinator 410, does not result in a partially executed transaction, which would violate an atomicity guarantee for the transaction that all (or none) of a transaction completes, the transaction coordinator may store various information about the transaction so that the transaction can be resumed by another transaction coordinator in some embodiments. In FIG. 5, transaction ledger 510 (which may be similar to transaction ledger 420 in FIG. 4) may store transactions across database service 210 (or a portion thereof), in some embodiments.

A transaction entry, such as entries 512a and 512b, may include, a timestamp assigned to the transaction by the transaction coordinator 522a and 522b, preconditions (if any) of operations performed in the transaction 526a and 526b, the operations to be performed (e.g., reads, writes, updates, inserts, additions, deletions, etc.) 528a and 528b and an identifier of the assigned transaction coordinator 532a and 532b, in some embodiments. The state of the transaction, transaction state 524a and 524b, may be included and updated, in some embodiments. For example, the possible states of transaction state 524 may include "Started," "Committed," "Completed," or "Aborted." A transaction identifier, such as transaction identifiers 534a, and 534b, may be stored for each transaction in order to identify operations that include the identifier as associated with the transaction, in some embodiments).

A transaction ledger may be implemented using various storage technologies or systems, in some embodiments. For example, transaction ledger 420 may be implemented as another table in database service 210 or hosted in another type of storage system or service in provider network 200. In at least some embodiments, transaction ledge may be organized as an append-only log. In some embodiments, transaction ledger 420 may support operations for scanning and truncating the log. For example, scanning may be used for transaction recovery. In some embodiments, portions of the ledger that contain already committed or aborted transactions can be discarded using truncation to reclaim space and to reduce the number of records (e.g., when scanned for transaction recovery). In some embodiments, transaction records may be retained for a period of time to support additional features such as monitoring and/or debugging. In some embodiments, transactions on different tables may share the same transaction ledger. In some embodiments, multiple transaction ledgers could be used in parallel. In some embodiments, transactions can be assigned to a ledger using a fixed assignment, e.g. all transactions on tables in a specific customer account use a specific ledger, or can be randomly assigned to a transaction ledger. In at least some embodiments, transaction ledgers may be used to provide a stream of transactions performed in database and/or table that are sent to another system.

Turning back to FIG. 4, transaction coordinator may send requests to prepare an individual item within the transaction, such as requests 436, 440, and 444, for the transaction to the storage nodes that store the transaction, such as storage nodes 430a, 430b, and 430c (which may be storage nodes in database services 210 and/or other data stores, such as storage nodes for storage service(s) 280). Storage nodes 430 may also receive a timestamp value assigned to the transaction, as well as further information, for determining whether the storage node 430 can accept the transaction for the item, in some embodiments, based on an evaluation of the timestamp and other information maintained for the item by storage nodes 430a.

In some embodiments, an item stored in a table may include system data for ordering transaction requests according to an independently assigned sequence and application data, according to some embodiments. An item may maintain system data as attributes of the item or in a separate collection of data describing one or multiple items in addition to application data (e.g., application visible data used by an application when interacting with the item), in some embodiments. System data may include various information for ordering, accepting, and/or rejecting transaction requests and non-transaction requests at storage nodes. For example, system data may include a timestamp of a latest committed transaction operation that has written to the item, an identifier of a transaction coordinator that submitted the transaction of the latest committed transaction operation 542 that has written to the item, a timestamp of the latest non-transaction write to the item, a timestamp of the latest read of the item, a timestamp of pending transaction that intends to write to the item, an indication of a successfully checked precondition for the pending transaction, an indication of whether item has been deleted according to a tombstone marker, and a history or set of transactions that have been accepted but not yet performed, in some embodiments.

In some embodiments, storage nodes 430 may send respective determinations 438, 442, and 446 to transaction coordinator node 410, indicating whether the transaction for the item is accepted or rejected by the storage node. If transaction coordinator node 410 does not receive a response, transaction coordinator node 410 may retry a number of times before aborting the transaction. Based on the responses, transaction coordinator 410 may determine whether the transaction can be committed or aborted, in some embodiments. An update to transaction ledger 420 to reflect the decision 448 may be made, in some embodiments. The first phase 402 may be complete. Please note that further interactions may be performed if the transaction aborts which are not illustrated.

If the transaction is committed, second phase 404 may be performed by transaction coordinator node 410. Transaction coordinator node 410 may send respective requests to perform the item transactions, 452, 456, and 460, to storage nodes 430. Once storage nodes 430 have performed the item transactions (which may be performed according to an ordering or timing determined by storage nodes 430 after receipt of requests 452, 456, and 460, in some embodiments), then storage nodes 430 may return responses indicating completion, such as responses 454, 458, and 462. Transaction coordinator 410 may record 464 the state of the transaction as completed in transaction ledger 420 and send a completion indication 466 for the transaction (e.g., to a client or request routing node to forward to a client).

Figure 6:
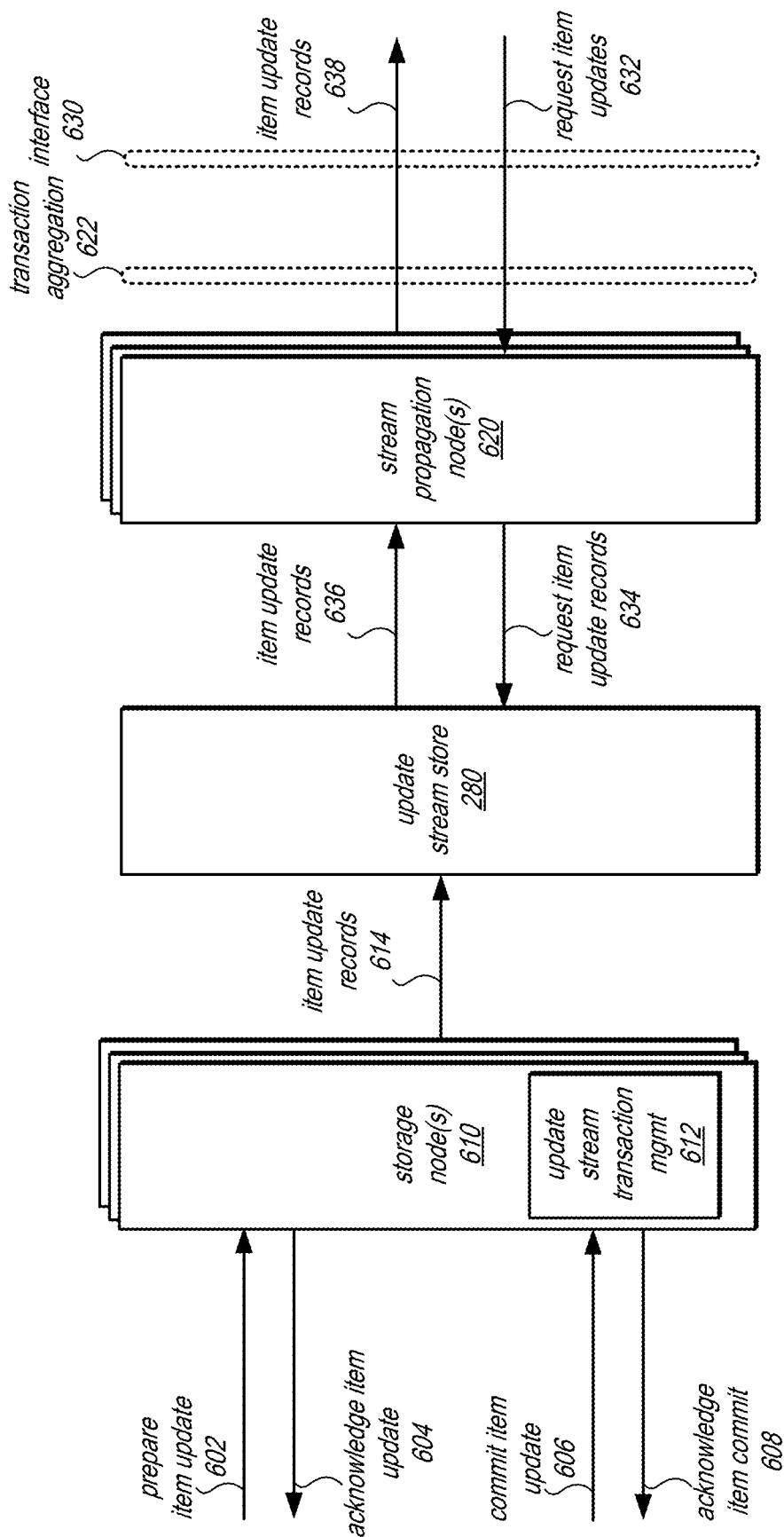
FIG. 6 is a logical block diagram illustrating generating and providing access to a stream of transaction updates to a database, according to some embodiments.

As discussed above with regard to FIGS. 3A to 4, storage nodes may participate in singleton operations and transactions. The storage nodes may record update may as a result of these operations and transactions in an update stream. FIG. 6 is a logical block diagram illustrating generating and providing access to a stream of transaction updates to a database, according to some embodiments.

Storage node(s) 610, similar to storage node(s) 230 in FIG. 2, may receive requests to prepare items for update 602 and acknowledge the prepare item updates 604, commit idem updates 606, and acknowledge the item commit 608 as part of a transaction protocol discussed above in FIG. 4. When these requests are received, storage node(s) 610 may generate records to include an update stream for the operations requested (e.g., prepare item, update item, etc.). Storage node(s) 610 may also implement update stream transaction management 612 to identify which records should be added to an update stream, and which records should be excluded according to whether the records describe updates to items included in a transaction that is committed (e.g., according to the various techniques discussed below with regard to FIG. 9). Item update records 614 may include a description of the update and an identifier for the transaction (e.g., identifier 534 in FIG. 5), when added to a stream of updates in update stream store 280.

Interface 630 may provide a separate interface for accessing an update stream and may be an Application Programming Interface (API), command line interface, and/or Graphical User Interface (GUI), in some embodiments. Stream propagation node(s) 620 may receive a request via interface 630 to get items from a stream of updates. The requests may be for item updates at a table or partition thereof. The updates may include updates not performed as part of a transaction (e.g., singleton writes which may not have an associated transaction identifier). The request may include an iterator or marker that identifies where in the stream the stream propagation node(s) 620 can read from. For example, a request may include a timestamp value as the iterator so that a stream propagation node 620 will only retrieve records on or after the timestamp value (e.g., up to a current time or some other range). Stream propagation node(s) 620 may then request item update records 634 from the stream of updates, which may be returned 636 as item update records.

In some embodiments, stream propagation node(s) 620 may return the item update records 638 as received. In other embodiments, transaction aggregation 622 may be implemented. For example, one of the stream propagation node(s) 620 may act as an aggregator and wait to send all updates for a same transaction together (instead of individually). In scenarios where each update stream corresponds to a different table (or partition thereof) and a transaction updates across multiple tables, transaction aggregation 622 may aggregate item update records from different update streams before returning the records 638. A stream propagation node(s) 620 acting as an aggregator may perform permission checks, identity checks, or other techniques to ensure that transactions that occur across tables which have different access privileges (e.g., transactions across tables for different user accounts) may only receive updates to items for which the requesting application has authorization to access (e.g., transaction updates for a transaction performed across multiple tables may be provided differently to different client applications so that a client application associated with one table will only get the updates for that one table even though other updates were performed to another table in the transaction). Alternatively, all transaction updates across all tables could be visible to a client application, in some embodiments (e.g., where permission or authorization to view cross table transactions was granted to a client application).

Figure 7:
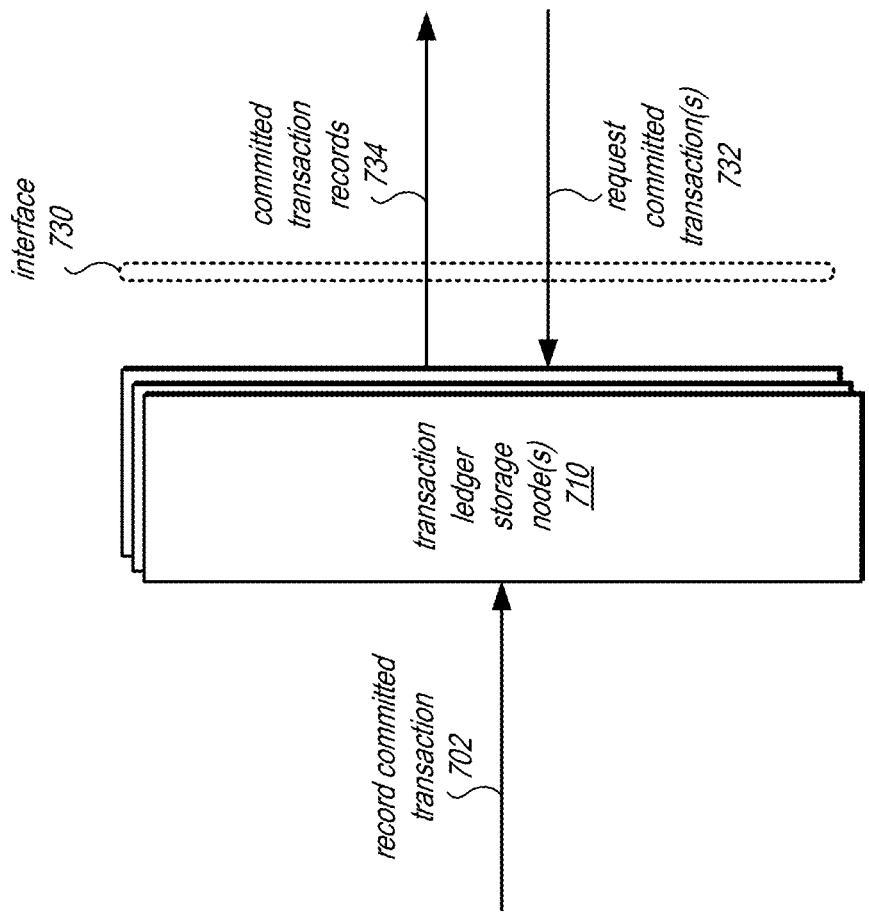
FIG. 7 is a logical block diagram illustrating providing access to a transaction ledger for committed transactions in a database, according to some embodiments.

In order to identify all updates that are part of a transaction without waiting for the item updates to be received in the update stream discussed above with regard to FIG. 6, transaction information, including a description of items updated by a transaction may be made available, in some embodiments. As discussed below with regard to FIG. 8, another update stream for committed transactions could be implemented to provide transaction information. Alternatively, FIG. 7 is a logical block diagram illustrating providing access to a transaction ledger for committed transactions in a database, according to some embodiments.

Transaction ledger storage node(s) 710 may be similar to storage nodes 230 discussed above with regard to FIG. 2, and may store a transaction ledger on behalf of one or multiples tables in database service 210. As discussed above with regard to FIG. 4, updates to the transaction ledger may include requests 702 to record a committed transaction, in some embodiments. Transaction ledger storage node(s) 710 may update the transaction ledger state to reflect the change to a committed state.

Interface 730 may be implemented to provide direct access to the transaction ledger, in some embodiments. Interface 730 may be, for example, an API, command line interface, or GUI, which may support a request for committed transaction(s) 732. For example, a transaction identifier (as provided in an item update record as discussed above with regard to FIGS. 1 and 6) may be included in the request 732. Transaction ledger storage node(s) 710 may process the request like a request to get an item, identifying the transaction item and returning the information described therein as a committed record 734. In at least some embodiments, the record format may include information from the transaction ledger for the transaction including, but not limited to, a timestamp, preconditions, transaction state, operations, and other information, such as the assigned transaction coordinator. In some embodiments, some descriptive information, such as various internal system data, such as transaction state and assigned transaction coordinator, may not be included in the record returned in response to the request.

Figure 8:
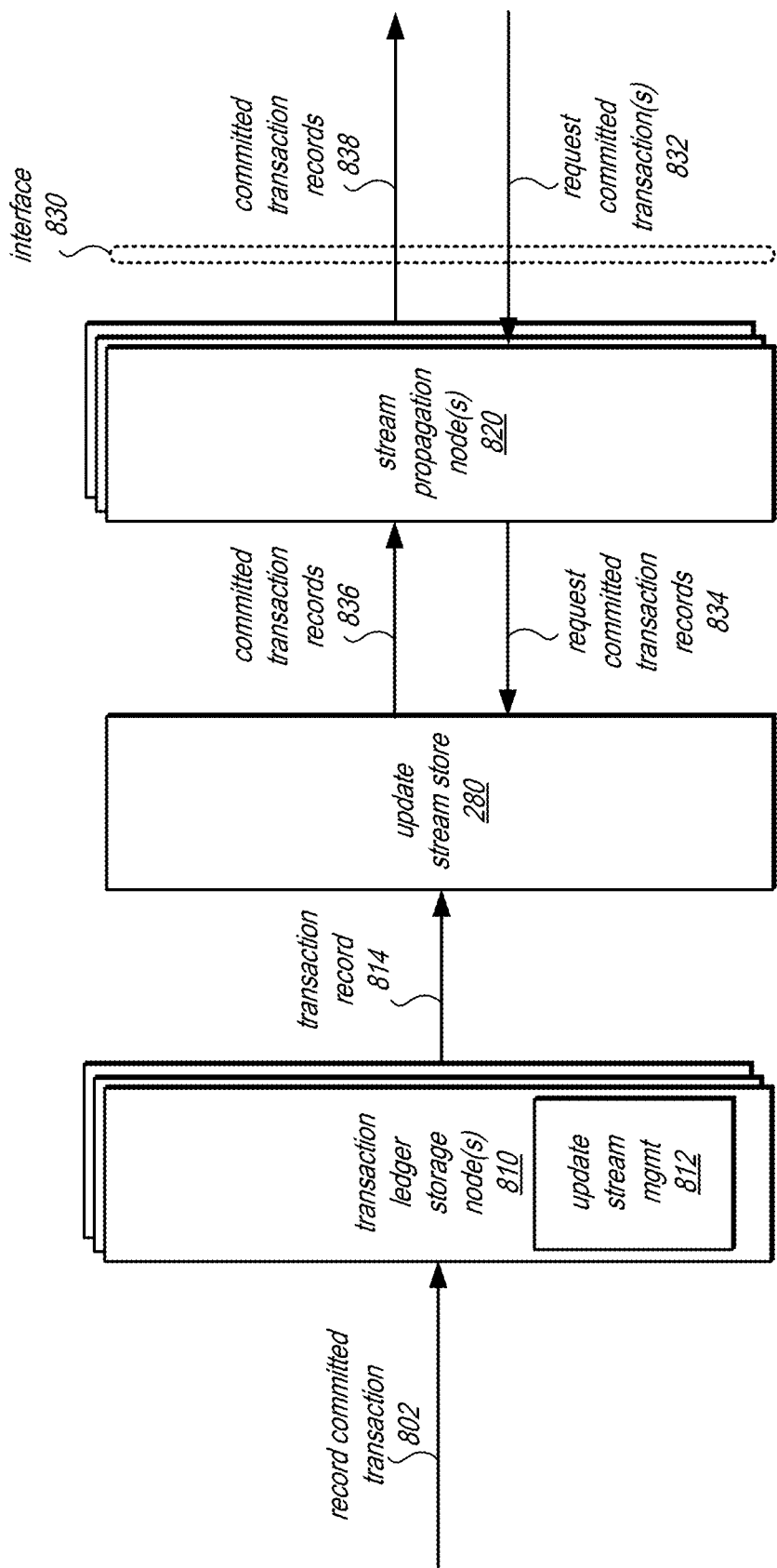
FIG. 8 is a logical block diagram illustrating providing a stream of updates to a transaction ledger, according to some embodiments.

FIG. 8 is a logical block diagram illustrating providing a stream of updates to a transaction ledger, according to some embodiments. Transaction ledger storage node(s) 810 may be similar to storage nodes 230 discussed above with regard to FIG. 2, and may store a transaction ledger on behalf of one or multiples tables in database service 210. As discussed above with regard to FIG. 4, updates to the transaction ledger may include requests 802 to record a committed transaction, in some embodiments. Transaction ledger storage node(s) 810 may update the transaction ledger state to reflect the change to a committed state. Transaction ledger node(s) 810 may implement update stream management 812 to determine whether a stream of updates have been enabled for a transaction, as discussed below with regard to FIG. 10. If a stream of updates has been enabled for the transaction, then a transaction record 814 may be sent to be included in the stream of updates in update stream store 280.

Similar to the stream of updates to items discussed above with regard to FIG. 6, a stream of committed transactions may be made accessible to a client application or user via interface 830. A request 832 for committed transactions may be received via interface 830 (e.g., an API, command line interface, or GUI) to stream propagation nodes 820, which may pull additional transactions from update stream store 280 (e.g., via a request for committed transaction records 834). The committed transaction records 836 may be returned to stream propagation node(s) 820, which may then return the committed transaction records 838 via interface 830.

Figure 9:
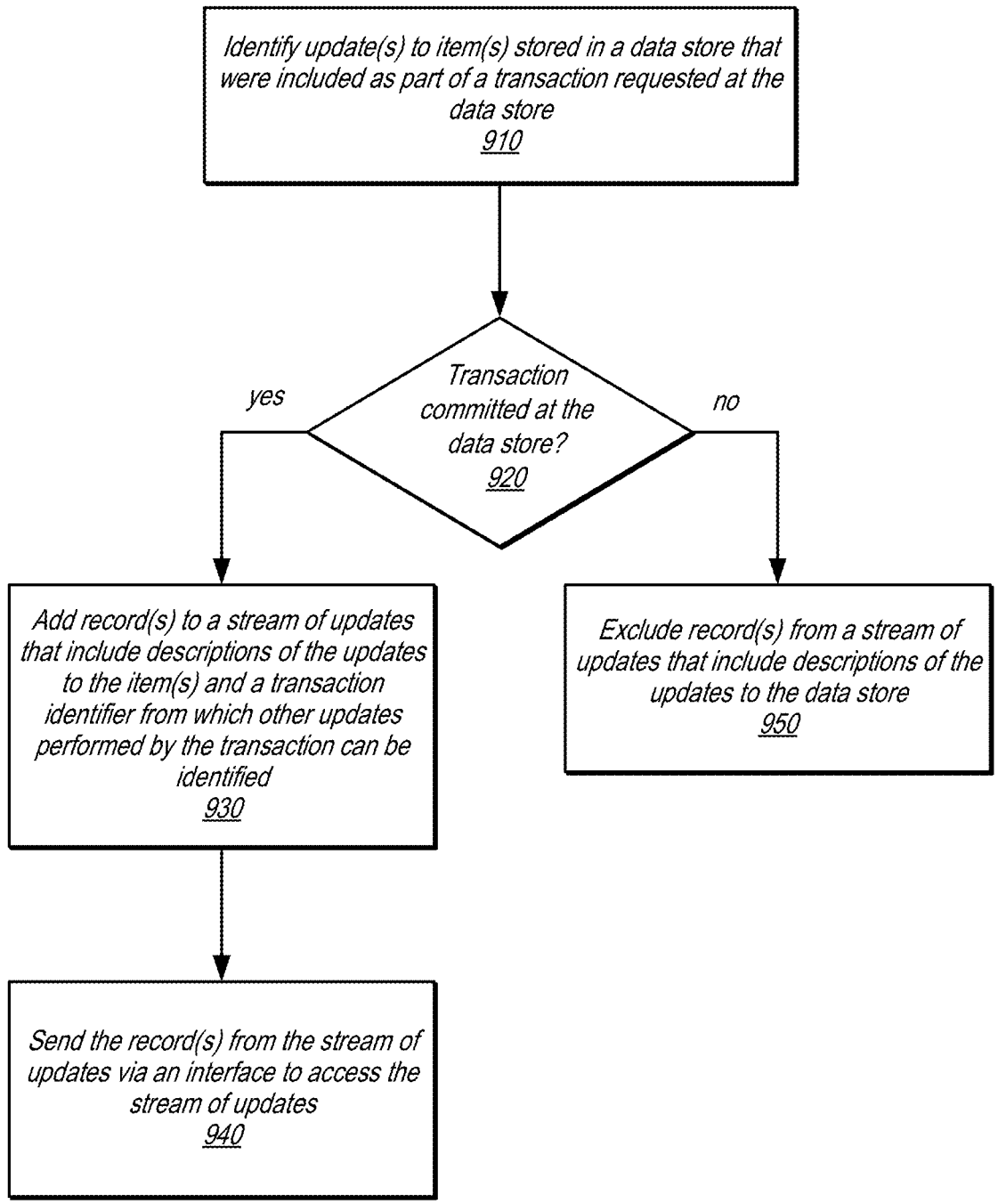
FIG. 9 is a high-level flowchart illustrating various methods and techniques to implement streaming committed transaction updates to a data store, according to some embodiments.

The examples of a database service that implements streaming committed transaction updates to a data store as discussed in FIGS. 2-8 above have been given in regard to a database service (e.g., a non-relational or NoSQL database service or a relational database service). However, various other types of data access, management, or control systems or data processing systems may implement transactions across a distributed data set or data sets and thus may implement streaming committed transaction updates to a data store, in other embodiments. FIG. 9 is a high-level flowchart illustrating various methods and techniques to implement streaming committed transaction updates to a data store, according to some embodiments. These techniques, as well as the techniques discussed with regard to FIG. 10, may be implemented using components or systems as described above with regard to FIGS. 2-8, as well as other types of databases, data stores, or systems, and thus the following discussion is not intended to be limiting as to the other types of systems that may implement the described techniques.

Requests to perform transactions may be received at a data store, in various embodiments. Transaction requests may include operations to multiple items performed across multiple different locations in the data store (e.g., to items in different table partitions, different tables, files or objects stored on different hosts or for different user accounts, etc.). In addition to requests to perform transactions, singleton or individual operation requests (e.g., to read or write items) may also be received at the data store (which may not be annotated to include a transaction identifier in some embodiments). A stream of updates may be established to capture updates from both the singleton operations and transactions, in some embodiments.

As indicated at 910, update(s) to item(s) stored in a data store that were included as part of a transaction requested at the data store may be identified, in some embodiments. For example, a storage node, stream propagation node, or other component, that applies or receives updates (or submits the updates, such as a transaction coordinator) may receive requests to perform the updates as part of a transaction. As indicated at 920, a determination may be made as to whether the transaction committed at the data store, in some embodiments. For example, as discussed above with regard to FIG. 4, a transaction may be identified as committed by a transaction coordinator or other component implementing a transaction protocol, that the transaction has satisfied requirements to be committed at the data store. An indication that the transaction is committed may be provided to the storage node, or other component, as part of an instruction to apply or otherwise perform an update to an item included in the transaction.

If the transaction was identified as committed, then as indicated at 930, record(s) may be added to a stream of updates that include descriptions of the updates to the items and a transaction identifier from which other updates performed by the transaction can be identified, in some embodiments. For example, a stream of updates may be implemented and stored using an ordered log or other ordered storage service that enforces an ordering of updates to the log to provide the updates described by the log in an order according to which the updates were applied (e.g., according to chain replication, Paxos, or other consensus or ordering techniques).

As indicated at 940, the record(s) may be sent via an interface to access the stream of updates, in some embodiments. An interface to access the stream of updates may be different from an interface to update the data store, in some embodiments. In this way, different resources can be used to serve requests for update records from the stream of updates (e.g., instead of storage node resources which may be serving requests to directly access the data store). The records may be reformatted, scrubbed, or otherwise modified, in some embodiments, to remove system information (e.g., identity of client that performed the update, internal metadata such as the identity of the transaction coordinator).

To send the record(s) various techniques may be used. For example, a pull-based method similar to that illustrated above with regard to FIG. 6 where a client can submit requests to receive additional updates from the stream of updates (e.g., by including an iterator or other marker that identifies what record have already been provided from the stream of updates). Alternatively, in some embodiments, a push-based method may be implemented where the updates may be sent to registered client, system, endpoint, or other service (e.g., another service in provider network which may implement an application that performs operations based upon the transaction updates).

As indicated at 950, for those identified updates that are not included as part of transaction determined to be committed at the data store, records that describe the updates may be excluded from a stream of updates that includes descriptions of updates to the data store, in some embodiments. In this way, the addition of records to the stream of updates may be limited those updates that are included in transactions that are committed to the database. For example, records that describe updates to items that have been received in the prepare phase in FIG. 4 (prepare item requests) may have records generated, but these records may be filtered out from other updates that are added to the stream of updates. Other records that describe operations that do not result in a change to an item may also be excluded, in some embodiments. For example, an operation that is included as part of a transaction may determine whether a condition is valid (e.g., if an item has a particular value) before proceeding to perform other operations. The condition check operation may have a record generated to describe the operation, in some embodiments, but the record may be excluded because it does not change an item's value. In another example, records that indicate that a transaction was aborted may be excluded from the stream of updates. Note that excluded records from the stream of updates may occur for in progress transactions that will ultimately be committed (but have not yet existed the prepare phase), in some scenarios. However, by excluding these records from the stream of updates, scenarios that result in a transaction aborting or otherwise failing to commit may not be included in the stream of updates.

Figure 10:
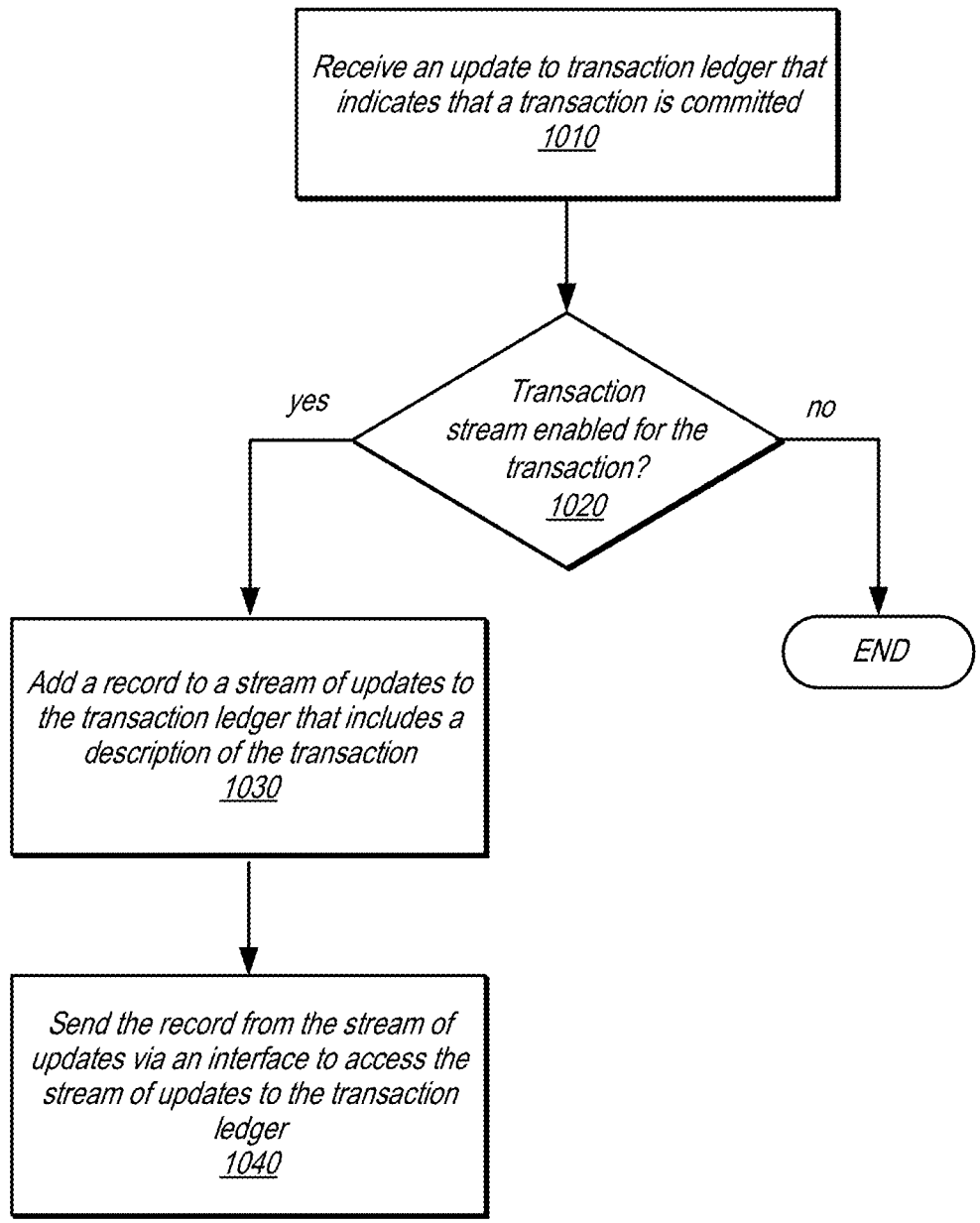
FIG. 10 is a high-level flowchart illustrating various methods and techniques to implement streaming transaction ledger updates, according to some embodiments.

FIG. 10 is a high-level flowchart illustrating various methods and techniques to implement streaming transaction ledger updates, according to some embodiments. As indicated at 1010, an update to a transaction leger may be received that indicates that a transaction is committed, in some embodiments. For example, as discussed above with regard to FIG. 4, a transaction ledger may be updated in a transaction protocol to indicate various states of a transaction including, "prepare," "committed" and "complete."

When a transaction is committed, a transaction coordinator, or other component performing a transaction, may write to an entry for the transaction to modify or update the state to be committed.

As indicated at 1020, a determination may be made as to whether a transaction stream has been enabled for the transaction, in some embodiments. For example, an interface may support requests (e.g., via an API, command line interface, and/or GUI) to identify a table, group of tables, or other data set, such as a collection, document, group of documents, partition, and so on, for which to create a stream of updates that describe transactions to the table, group of tables, or other data set. In some embodiments, the interface may support a request that specifies a user account, transaction source, group of user accounts, or other identifier that can be used to determine whether a transaction can be included in a stream of updates. If a transaction stream is not enabled, then no streaming of the transaction may occur, as indicated by the negative exit from 1020. However, as discussed above with regard to FIG. 7, in some embodiments, the transaction ledger may be exposed to queries or other requests to get information describing a transaction.

If a transaction stream has been enabled for the transaction, then a record may be added to a stream of updates to the transaction ledger that includes a description of the transaction and an identifier for the transaction, in some embodiments, as indicated at 1030. For example, as discussed above with regard to FIG. 9, a stream of updates may be implemented and stored using an ordered log or other ordered storage service that enforces an ordering of updates to the log to provide the updates described by the log in an order according to which the updates were applied (e.g., according to chain replication, Paxos, or other consensus and ordering techniques). Similarly, the stream of updates to the transaction ledger may include one or more records that are provided from the stream of updates in an order according to which the transactions were applied.

Adding the record may, for example, be performed by a request to submit the transaction to the stream of updates. The record format may include information from the transaction ledger for the transaction including, but not limited to, a timestamp, preconditions, transaction state, operations, and other information, such as the assigned transaction coordinator. In some embodiments, some descriptive information, such as various internal system data, such as transaction state and assigned transaction coordinator, may not be included in the record added to the stream of updates.

As indicated at 1040, the record may be sent from the stream of updates to access the stream of updates to the transaction ledger, in some embodiments. For example, a pull-based method similar to that illustrated above with regard to FIG. 6 where a client can submit requests to receive additional updates from the stream of updates (e.g., by including an iterator or other marker that identifies what record have already been provided from the stream of updates). Alternatively, in some embodiments, a push-based method may be implemented where the updates may be sent to registered client, system, endpoint, or other service (e.g., another service in provider network which may implement an application that performs operations based upon the transaction updates).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 11:
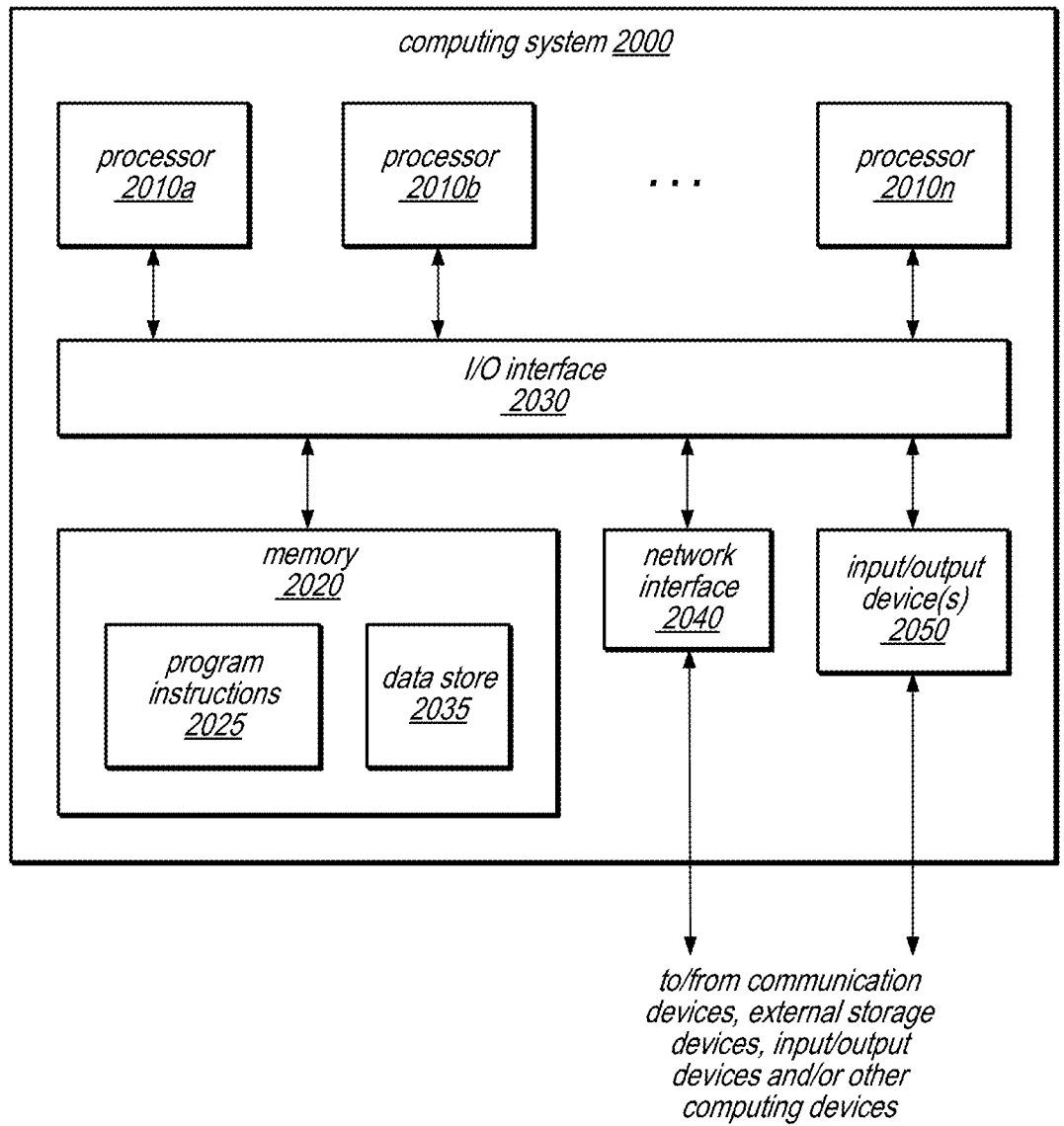
FIG. 11 is a block diagram illustrating an example computing system, according to some embodiments.

Embodiments to implement ordering transaction requests in a distributed database according to an independently assigned sequence as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 2020 may store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, that implement the various embodiments of the systems as described herein, and data store 2035, comprising various data accessible by program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A database system, comprising:
   one or more compute nodes, each respectively comprising a processor and a memory;
   the database system, configured to:
      receive requests to perform one or more transactions that perform updates to one or more items stored as part of the database system;
      generate respective records to describe the updates to the one or more items performed as part of the one or more transactions;
      exclude, from a stream of updates, those records of the respective records that describe updates that were included as part of those transactions of the one or more transactions determined not to be committed to the data store, wherein the stream of updates describes updates to individual items in the data store in an order in which the updates to the individual items in the data store are applied; and
      responsive to a request to obtain updates to the database system from the stream of updates, send a record from the stream of updates that includes:
         a description of one of the identified one or more updates; and
         an identifier for one of the one or more transactions determined to be committed to the data store according to which other records in the stream of updates that describe other updates performed by the one transaction can be identified.

2. The database system of claim 1, wherein to exclude, from the stream of updates, those records of the respective records that describe updates that were included as part of those transactions of the one or more transactions determined not to be committed to the data store, the database system is configured to identify those respective records that describe a prepare item update.

3. The database system of claim 1, wherein the database system implements a transaction ledger comprising respective records that describe the one or more transactions, and wherein the database system is further configured to:
   receive a request to obtain a record from the transaction ledger according to the identifier for one of the one or more transactions; and
   return the respective record for the one transaction.

4. The database system of claim 1, wherein the database system is non-relational database service offered by a provider network that stores one or more databases tables that include the one or more items, and wherein the stream of updates is enabled for the one or more database table responsive to a request received via an interface for the non-relational database service to enable the stream of updates for the one or more database tables.

5. A method, comprising:
performing, by one or more computing devices:
identifying one or more updates to one or more items stored in a data store that were included as part of one or more transactions requested at the data store;
limiting addition of records to a stream of updates to those updates of the one or more updates that were included as part those transactions of the one or more transactions determined to be committed to the data store, wherein the stream of updates describes updates to individual items in the data store in an order in which the updates to the individual items in the data store are applied; and
sending, via an interface to access the stream of updates, a record from the stream of updates that includes:
a description of one of the identified one or more updates; and
an identifier for one of the one or more transactions determined to be committed to the data store according to which other records in the stream of updates that describe other updates performed by the one transaction can be identified.

6. The method of claim 5, wherein the data store implements a transaction ledger comprising respective records that describe the one or more transactions, and wherein the method further comprises:
receiving a request to obtain a record from the transaction ledger according to the identifier for one of the one or more transactions; and
returning the respective record for the one transaction.

7. The method of claim 6, wherein the one transaction includes updates to different items in the data store stored at different tables in the data store and wherein the description of the one transaction in the respective record for the one transaction describes the updates to the one or more other items at the different tables in the data store.

8. The method of claim 5, wherein limiting addition of records to the stream of updates to those updates of the one or more updates that were included as part those transactions of the one or more transactions determined to be committed to the data store comprises excluding those updates that describe a transaction abort.

9. The method of claim 5, wherein the sending of the record from the stream of records is sent responsive to receiving a request for update records from the update stream from a client, wherein the record is sent to the client.

10. The method of claim 5, further comprising:
receiving an update to a transaction ledger that indicates that the one transaction is committed at the data store;
determining that a stream of updates for transactions is enabled for the one transaction;
adding a record to the stream of updates for transactions that includes a description of the one transaction that includes updates to one or more other items in the data store included in the one transaction.

11. The method of claim 10, wherein the determining that the stream of updates for transactions is enabled for the one transaction comprises identifying that the transaction performs an update to a table in the data store that for which the stream of updates for transactions is enabled.

12. The method of claim 5, wherein sending the record from the stream of updates comprises aggregating the record from the stream of updates with one or more other records from one or more other streams of updates that describes updates to one or more other items in the data store included in the one transaction.

13. The method of claim 5, wherein the interface to access the stream of updates is different than an interface via which the one or more transactions are requested.

14. One or more non-transitory, computer-readable storage media, storing program instructions that when executed on or across one or more computing devices cause the one or more computing devices to implement:
from one or more updates to one or more items stored in a data store that were included as part of one or more transactions to the data store, determining those updates of the one or more updates that were performed as part those transactions of the one or more transactions determined not to be committed to the data store;
excluding from a stream of updates the updates of the one or more updates that were included as part those transactions of the one or more transactions that were determined not to be committed to the data store, wherein the stream of updates describes updates to individual items in the data store in an order in which the updates to the individual items in the data store are applied; and
sending, via an interface to access the stream of updates, a record from the stream of updates that includes:
a description of one of the identified one or more updates; and
an identifier for one of the one or more transactions determined to be committed to the data store according to which other records in the stream of updates that describe other updates performed by the one transaction can be identified.

15. The one or more non-transitory, computer-readable storage media of claim 14, wherein the program instructions when executed by the one or more computing devices cause the one or more computing devices to further implement:
receiving an update to a transaction ledger that indicates that the one transaction is committed at the data store;
determining that a stream of updates for transactions is enabled for the one transaction;
adding a record to the stream of updates for transactions that includes a description of the one transaction that includes updates to one or more other items in the data store included in the one transaction.

16. The one or more non-transitory, computer-readable storage media of claim 15, wherein the updates to the one or more other items include updates to a plurality of different tables stored in the data store.

17. The one or more non-transitory, computer-readable storage media of claim 15, wherein, in determining that the stream of updates for transactions is enabled for the one transaction, the program instructions when executed by the one or more computing devices cause the one or more computing devices to implement identifying that the transaction is associated with a user for which the stream of updates for transactions is enabled.

18. The one or more non-transitory, computer-readable storage media of claim 14, wherein the program instructions when executed by the one or more computing devices cause the one or more computing devices to further implement excluding from the stream of updates a condition check operation.

19. The one or more non-transitory, computer-readable storage media of claim 14, wherein the data store implements a transaction ledger comprising respective records that describe the one or more transactions, and wherein the program instructions when executed by the one or more computing devices cause the one or more computing devices to further implement:
   receiving a request to obtain a record from the transaction ledger according to the identifier for one of the one or more transactions; and
   returning the respective record for the one transaction.

20. The one or more non-transitory, computer-readable storage media of claim 14, wherein the data store is a data storage service offered by a provider network, wherein the one or more updates to the one or more items were received as requests to perform the one or more transactions via interface for the data storage service that is different than the interface to access the stream of updates.

* * * * *